(12) United States Patent
Yang et al.

(10) Patent No.: US 12,356,900 B1
(45) Date of Patent: Jul. 15, 2025

(54) SUPPLEMENTAL LIGHTING METHOD FOR VERTICAL MULTI-LAYER CULTIVATION OF WRAPPER TOBACCO LEAVES

(71) Applicant: Tobacco Research Institute of Hubei Province, Wuhan (CN)

(72) Inventors: Jinpeng Yang, Wuhan (CN); Chunlei Yang, Wuhan (CN); Jun Yu, Wuhan (CN); Zhilong Bie, Wuhan (CN); Kaixiao Fan, Wuhan (CN); Yuan Huang, Wuhan (CN); Sicheng Liu, Wuhan (CN); Chuanzong Li, Wuhan (CN); Wenchang Huang, Wuhan (CN); Gang Liu, Wuhan (CN); Yong Rao, Wuhan (CN); Liguang Chai, Wuhan (CN); Yulei Zhao, Wuhan (CN); Jiazhen Chen, Wuhan (CN); Yu Song, Wuhan (CN); Yiyang Zhang, Wuhan (CN); Youlun Fan, Wuhan (CN); Zhenxin Wu, Wuhan (CN); Xin Wang, Wuhan (CN)

(73) Assignee: Tobacco Research Institute of Hubei Province, Wuhan (CN)

( * ) Notice: Subject to any disclaimer, the term of this patent is extended or adjusted under 35 U.S.C. 154(b) by 0 days.

(21) Appl. No.: 19/094,852

(22) Filed: Mar. 29, 2025

(30) Foreign Application Priority Data

Aug. 28, 2024 (CN) .......................... 202411190574.X

(51) Int. Cl.
*A01G 22/45* (2018.01)
*A01G 9/24* (2006.01)

(52) U.S. Cl.
CPC .............. *A01G 9/249* (2019.05); *A01G 22/45* (2018.02)

(58) Field of Classification Search
CPC ......... A01G 9/249; A01G 22/45; A01G 7/045
See application file for complete search history.

(56) References Cited

U.S. PATENT DOCUMENTS

| | | | | |
|---|---|---|---|---|
| 11,291,165 B2 * | 4/2022 | Krijn | ...................... | A01G 7/045 |
| 2006/0016125 A1 * | 1/2006 | Krauss | ................... | A01G 7/045 424/751 |
| 2014/0259920 A1 * | 9/2014 | Wilson | ................... | A01G 31/02 47/62 R |
| 2020/0068810 A1 * | 3/2020 | Pahlevaninezhad | ... | H05B 47/11 |
| 2020/0184153 A1 * | 6/2020 | Bongartz | ............... | A01G 9/249 |
| 2021/0127593 A1 * | 5/2021 | Krijn | ..................... | H05B 47/105 |

FOREIGN PATENT DOCUMENTS

| | | | | | |
|---|---|---|---|---|---|
| CN | 203251733 U | * | 10/2013 | | |
| CN | 203814330 U | * | 9/2014 | | |
| CN | 217764180 U | * | 11/2022 | | |
| CN | 220606756 U | * | 3/2024 | ............. | A01G 31/02 |
| WO | WO-2014037860 A1 | * | 3/2014 | ............... | A01G 7/04 |
| WO | WO-2024235623 A1 | * | 11/2024 | | |

OTHER PUBLICATIONS

He Fen et al., "Selection of Artificial Light in Flue-cured Tobacco Space Seedling", Chinese Agricultural Science Bulletin, Jul. 20, 2015, pp. 250-253.

CNIPA, Notification of a First Office Action for CN202411190574.X, Dec. 6, 2024.

Hubei Tobacco Science Research Institute (Applicant), Replacement claims (allowed) of CN202411190574.X, Jan. 22, 2025.

CNIPA, Notification to grant patent right for invention in CN202411190574.X, Jan. 27, 2025.

* cited by examiner

*Primary Examiner* — Monica L Perry
(74) *Attorney, Agent, or Firm* — Hemisphere Law, PLLC; Zhigang Ma

(57) ABSTRACT

The present disclosure provides a supplemental lighting method for vertical multi-layer cultivation of wrapper tobacco leaves, including the following steps: providing multi-layer vertical facilities, facilities including at least one cultivation rack having a plurality of layers; and providing supplemental lighting systems to each rack layer. For each rack layer the light intensity and light quality provided by the corresponding supplemental lighting system are set respectively according to a determined growth phase of the tobacco leaves during the cultivation process. The process includes cultivation of tobacco leaves through growth phases comprising a clumping period, a vigorous growth period, and a maturity period. During the clumping period, the light intensity provided comprises a first light intensity setting. During the vigorous growth period, the light intensity provided comprises a third light intensity setting. During the maturity period, the light intensity provided comprises a second light intensity setting.

8 Claims, No Drawings

SUPPLEMENTAL LIGHTING METHOD FOR VERTICAL MULTI-LAYER CULTIVATION OF WRAPPER TOBACCO LEAVES

FIELD OF THE DISCLOSURE

The present disclosure belongs to the field of tobacco cultivation technology, and specifically relates to a supplemental lighting method for vertical multi-layer cultivation of wrapper tobacco leaves.

BACKGROUND

In recent years, China's cigar market has grown rapidly, especially in the past five years, with an average annual growth rate of more than 40% and a sales growth rate of more than 30%, and the development of cigars has become a new economic growth point in the tobacco industry. To develop industry, raw materials are the cornerstone; the raw materials of cigar smoke are composed of three parts: wrapper tobacco, binder tobacco and filler tobacco, among which the wrapper tobacco has the highest quality requirements and the greatest economic value. Due to the late start of the research and development of domestic cigar raw material technology, most of the raw materials of domestic cigars rely on imports, especially the raw materials for wrappers tobacco. High-quality wrapper tobacco requires the quality of tobacco leaves to be thin and complete, the leaf vein are fine but not protruding, strong tensile force, uniform color, no spots or holes, good flammability and no miscellaneous gases, higher quality requirements inevitably impose higher demands on ecological suitability layout and the matching of production technology.

At present, the current traditional production technology in the production of wrapper tobacco raw materials has not been targeted system technology, the large-scale production of wrapper tobacco is blank, the supply of wrapper tobacco is actually mainly from the extensive production of the same tobacco leaf produced by the wrapper tobacco, binder tobacco, filler tobacco all types of mixed raw materials in the passive selection, resulting in low yield of wrapper tobacco, the quality is also uneven. Therefore, how to produce high-quality wrapper tobacco leaves in China and effectively change the passive situation of large quantities of imported raw materials by industrial enterprises is a prominent problem facing the development of China's cigar industry.

The use of greenhouses, polytunnel and other infrastructure can easily create and regulate the growth environment suitable for the growth and development of wrapper tobacco, and according to the economic value advantages of wrapper tobacco, facility cultivation may become an important development mode of wrapper tobacco industry; in order to improve the utilization efficiency of facility space, the implementation of multi-layer cultivation is often considered, which will lead to the relative lack of light in each layer of tobacco plants below the top layer, resulting in poor comprehensive quality of wrapper tobacco leaves and a significant decrease in the yield rate of wrapper tobacco.

SUMMARY

The object of the present disclosure is to provide a supplemental lighting method for vertical multi-layer cultivation of wrapper tobacco leaves, which is used to solve the problems that in the existing multi-layer cultivation mode, due to the relative lack of light of each layer of tobacco plants below the top layer, resulting in poor comprehensive quality of wrapper tobacco leaves and a significant decrease in the yield rate of wrapper tobacco.

In order to solve the technical problem, the present disclosure provides a supplemental lighting method for vertical multi-layer cultivation of wrapper tobacco leaves, including the following steps: providing multi-layer vertical facilities, supplemental lighting system, wherein, supplemental lighting system is located in multi-layer vertical facilities, and the multi-layer vertical facility also includes a cultivation rack which has at least two layers; when the cultivation rack have two layers, the light intensity and/or light quality of the supplemental lighting system are set respectively in the wrapper tobacco cultivation; the light intensity is 10-22 $\mu mol \cdot m^{-2} \cdot s^{-1}$; the light quality is obtained by a combination of at least two of red, blue, green, and yellow light.

In the supplemental lighting method provided by the present disclosure, the light intensity and the light quality can be used separately or in combination, for example, the light intensity in the supplemental lighting system can only be set, or only the light quality in the supplemental lighting system can be set, or the light intensity and light quality in the supplemental lighting system can be set at the same time; Preferably, when the light intensity and light quality in the supplemental lighting system are set at the same time, it is beneficial to improve the yield rate of wrapper tobacco.

In some embodiments, the light intensity includes the first light intensity, the second light intensity and the third light intensity; the first light intensity is 10-14 $\mu mol \cdot m^{-2} \cdot s^{-1}$ (for example, it can be 10 $\mu mol \cdot m^{-2} \cdot s^{-1}$, 11 $\mu mol \cdot m^{-2} \cdot s^{-1}$, 12 $\mu mol \cdot m^{-2} \cdot s^{-1}$, 13 $\mu mol \cdot m^{-2} \cdot s^{-1}$, 14 $\mu mol \cdot m^{-2} \cdot s^{-1}$ or other values in the range), the second light intensity is 14-18 $\mu mol \cdot m^{-2} \cdot s^{-1}$ (for example, it can be 14 $\mu mol \cdot m^{-2} \cdot s^{-1}$, 15 $\mu mol \cdot m^{-2} \cdot s^{-1}$, 16 $\mu mol \cdot m^{-2} \cdot s^{-1}$, 17 $\mu mol \cdot m^{-2} \cdot s^{-1}$, 18 $\mu mol \cdot m^{-2} \cdot s^{-1}$ or other values in the range), the third light intensity is 18-22 $\mu mol \cdot m^{-2} \cdot s^{-1}$ (for example, it can be 18 $\mu mol \cdot m^{-2} \cdot s^{-1}$, 19 $\mu mol \cdot m^{-2} \cdot s^{-1}$, 20 $\mu mol \cdot m^{-2} \cdot s^{-1}$, 21 $\mu mol \cdot m^{-2} \cdot s^{-1}$, 22 $\mu mol \cdot m^{-2} \cdot s^{-1}$ or other values in the range).

In some embodiments, the light quality comprises the first light quality, the second light quality and the third light quality; The first light quality is 45%-65% (for example, it can be 45%, 55%, 60%, 65% or other values in the range) blue light+35%-55% (for example, it can be 35%, 45%, 50%, 55% or other values in the range) red light, the second light quality is 50%-70% (for example, it can be 50%, 55%, 60%, 65%, 70% or other values in the range) blue light+ 20%-40% (for example, it can be 20%, 25%, 30%, 35%, 40% or other values in the range) red light+5%-15% (for example, it can be 5%, 10%, 15% or other values in the range) green light, the third light quality is 25%-40% (for example, it can be 25%, 30%, 35%, 40% or other values in the range) blue light+25%-35% (for example, it can be 25%, 30%, 35% or other values in the range) red light+20%-35% (for example, it can be 20%, 25%, 30%, 35% or other values in the range) green light+5%-15% (for example, it can be 5%, 10%, 15% or other values in the range) yellow light.

In some embodiments, wrapper tobacco cultivation includes the clumping periods (initial transplanting-the 30th day after transplanting), the vigorous growth periods (the 30th day after transplanting-the 55th day after transplanting) and the maturity periods (the 55th day after transplanting-the 110th days after transplanting); in the clumping periods, the light intensity is the first light intensity, and the light quality is the first light quality; in the vigorous growth periods, the light intensity is the third light intensity, and the light quality is the second light quality; In the maturity periods, the light intensity is the second light intensity, and the light quality is the third light quality.

In the present disclosure, the inventor found that light as a plant growth factor, its supply is too much (i.e., the light intensity is too large) will lead to more dry matter accumulation, the leaf thickening, the leaf vein thickening, and the supply is too weak (i.e., the light intensity is small) will cause the leaf to be too thin, the tobacco leaf oil content is low, the leaf is compact, and the industrial availability is not strong; further research by the inventor found that different light quality supplemental lighting or different color film coverage can affect the growth and development and quality formation of flue-cured tobacco. Therefore, the inventor obtained the best light intensity and light quality in the clumping periods, the vigorous growth periods and the maturity periods of wrapper tobacco cultivation by studying the growth law of wrapper tobacco cultivation, and used specific light intensity and light quality to supplement the light in the clumping periods, the vigorous growth periods and the maturity periods of wrapper tobacco cultivation, which is conducive to significant improvement the yield rate of wrapper tobacco.

In some embodiments, when the cultivation rack is larger than two layers, the light intensity is correspondingly increased by 15%-50% for each additional layer, for example, it can be 15%, 20%, 25%, 30%, 35%, 40%, 45%, 50% or other values in the range.

It should be noted that the corresponding enhancement of light intensity can also be adapted to adjustment according to the characteristics of the wrapper tobacco.

In some embodiments, the light source in the supplemental lighting system is selected from at least one of the lamp strips with LED light sources, the lamp tube with LED light sources, the alloy tungsten lamps or the alloy sodium lamps.

In the present disclosure, there is no special restriction on the space occupied by the supplemental lighting system, and the motorized layout can be carried out according to local conditions, and the above-mentioned light source can be used separately, can also be used in combination, and can also use other light sources in the prior art, as long as the light intensity and light quality required by the present disclosure can be satisfied.

In some embodiments, the illumination distance of the supplemental lighting system is 25 cm-35 cm, for example, it can be 25 cm, 27 cm, 29 cm, 31 cm, 33 cm, 35 cm or other values in the range; day-night cycle with supplemental lighting includes: 12 h-16 h during the day, for example, it can be 12 h, 13 h, 14 h, 15 h, 16 h or other values in the range; 8 h-12 h during the night, for example, it can be 8 h, 9 h, 10 h, 11 h, 12 h or other values in the range.

In some embodiments, the layer spacing of the cultivation rack is 1.6 m-2.4 m, for example it can be 1.6 m, 1.8 m, 2 m, 2.2 m, 2.4 m or other values in the range.

In the present disclosure, the layer spacing can also be adjusted according to the specific variety of wrapper tobacco.

In some embodiments, in multi-layer vertical facilities, the control temperature is 20° C. to 30° C., for example, it can be 20° C., 22° C., 24° C., 26° C., 28° C., 30° C. or other values in the range; the relative air humidity is 65%-85%, for example, it can be 65%, 70%, 75%, 80%, 85% or other values in the range.

In some embodiments, in multi-layer vertical facilities, the wrapper tobacco cultivation system is selected from at least one of the hydroponic systems, substrate culture systems, planting bag dropper systems, or pipeline vertical cultivation systems.

In the present disclosure, in order to ensure the effect of implementing wrapper tobacco cultivation and the convenience of operation, the multi-layer vertical facilities can be a sunlight greenhouse or a plastic steel polytunnel.

In some embodiments, pest and disease control steps are also included in the wrapper tobacco cultivation process.

In some preferred embodiments, pest and disease control nets can be managed using insect nets. when diseases occur in the rhizome, pesticides can be applied. Specifically, it can be: spraying cyhalothrin 1000 times for site sanitization and prevention of underground pests; and/or spraying 500 times of Baolik and methamethanine to prevent and control rhizome diseases; and/or spraying 2000 times of imidacloprid to control aphid.

The beneficial effect of the present disclosure is: different from the case of the prior art, the present disclosure adopts a specific light intensity and light quality to make up the light accurately in the clumping periods, the vigorous growth periods and the maturity periods of the wrapper tobacco cultivation respectively, so that the yield rate of wrapper tobacco is significantly improved, the quality of tobacco leaves is significantly improved, and it made the space utilization rate of the multi-layer vertical facilities has been increased by more than 100%, thereby the comprehensive quality of wrapper tobacco leaves has been significantly improved.

DETAILED DESCRIPTION OF PREFERRED EMBODIMENTS

The technical solutions in the embodiments of the present disclosure will be clearly and completely described below in conjunction with the embodiments of the present disclosure, and it is obvious that the described embodiments are only part embodiments of the present disclosure, not all embodiments. Based on the embodiments in the present disclosure, all other embodiments obtained by a person skilled in the art without making creative work belong to the scope of protection of the present disclosure.

If no special description is made in the following embodiments and comparative embodiments, the transplanting and planting process of cigar tobacco plants is carried out using conventional tobacco cultivation technology, which can be implemented with reference to the technical content of cigar cultivation in Section 5 of Chapter 20 of 《 China Tobacco Cultivation 》 (edited by the Tobacco Research Institute of the Chinese Academy of Agricultural Sciences, November 2005). embodiments and comparative embodiments methods that do not specify specific conditions are usually in accordance with the general conditions and the conditions described in the manual, or in accordance with the conditions recommended by the manufacturer, and the general equipment, materials, reagents, etc., used can generally be obtained commercially unless otherwise specified.

In addition, the terms "the first", "the second", "the third" are used for only descriptive purposes and should not be construed as indicating or implying relative importance.

Example 1

The supplemental lighting method for wrapper tobacco cultivation provided in this embodiment is a wrapper tobacco planting experiment carried out in Enshi greenhouse in Hubei Province in 2023, the wrapper tobacco variety is CX-26, and the cultivation system adopts a two-layer vertical nutrient solution cultivation system.

The planting system of the production facility includes a two-layer vertical cultivation rack, a nutrient solution trough, a planting pot, a culture substrate, a nutrient solution and accessories.

The seedling, transplanting, harvesting process and requirements of cigar tobacco in this experiment are as follows:

1. Seedling

According to the implementation of conventional tobacco floating technical specifications, the seedling age is about 55 days, the quality of tobacco seedlings reaches the stem height of 9-12 cm, the stem straight stem ≥5 mm, the functional leaves (true leaves) 4-6 Piece, the root system is developed, and the group growth is strong and neat.

2. Transplanting (1) Basic Equipment and Material Requirements

Cultivation mode: the cultivation mode of two-layer steel rack vertical nutrient solution culture is adopted, and the spacing between the upper and lower layers is 2.0 m.

Planting pot: PS material horticultural planting pot, upper diameter 16 cm, lower diameter 13 cm, height 17.5 cm, the bottom has a plurality of hollow round holes with a diameter of 0.6±0.1 cm.

Culture substrate: the current general peat-type substrate (mixed with peat, perlite and vermiculite, 0.7 kg/pot on a dry basis), rotted cake fertilizer (prepared according to a dry basis of 0.07 kg/plant), the substrate is moistened with an appropriate amount of water and mixed into pots to reach 1 kg/pot (including pot weight).

Nutrient solution trough: the basic support of the nutrient solution trough is made with an extruded plastic board, the clearance size in the trough is 17 cm deep and 20 cm wide, the net length of a single trough is 4.5 m, the spacing between the planting plants is 45 cm, and the row spacing (i.e., the longitudinal center wheeldistance of the adjacent nutrient solution trough) is 1.0 m, that is, 10 wrapper tobacco plants are planted in each trough; the nutrient solution trough is paved with anti-seepage membrane, and a foam strip or wooden square with a width of 4 cm and a height of 6 cm is placed under the membrane to support the planting pot and provide space for root extension; in addition, each nutrient solution trough is equipped with basic accessories such as an inflatable pump and a pump-end filter pocket for circulating suction of nutrient solution.

Nutrient solution cover plate: in order to prevent the nutrient solution from growing algae and germs due to direct sunlight, a cover plate that blocks sunlight should be added to the nutrient solution trough and placed on the periphery of the planting pot.

The basic conditions of the greenhouse: the clearance height is 4.5 m, the single-span size is 8 m*45 m, the top of the greenhouse is a solid sunlight board made of FRP material (2 mm thick), there is an inner sunshade net, an external sunshade net and a spare cooling water curtain system, and there is an electric fan to ensure air circulation and a PS material canopy film that can be rolled up for ventilation around.

(2) Transplanting Operation

Mix the substrate and put the pot: evenly mix the rotted cake fertilizer into the conventional seedling substrate, and then put the pot, the substrate is flat and should not be over-compacted; after potting, gently place the planting pot on the planting bracket.

Perfusion of nutrient solution: the perfusion depth is 3-4.5 cm below the bottom of the customized pot.

Deep planting: the transplanting of tobacco seedlings is based on the planting pots of tobacco seedlings, and the transplanting depth reaches the center of tobacco seedlings and the upper surface of the culture substrate.

Post-planting management: before and after the clumping periods, a bib is needed, that is, to supplement the substrate defect at the base of the stem caused by natural sedimentation, and it is advisable to cover the base of the stem until the bib is basically full.

(3) Preparation and Application of Nutrient Solution

The large and medium elements required for the growth of the wrapper tobacco are prepared and applied according to Table 1, pay attention to the liquid level, supplement the nutrient solution every 6-10 days, and the concentration of the nutrient solution is consistent with the concentration of the nutrient solution in the stage of operation, and make up to the height of the original liquid level; on the 81st day of transplanting, the nutrient solution was emptied and replaced with the same amount of water, and then the water was replenished every 6-10 days, which was also made up to the height of the original liquid level. Iron salt stock solution and microelement stock solution were prepared according to Table 2, 0-20 days after transplanting the dose of 2.5 mL of iron salt stock solution and 5 mL of microelement stock solution were added to each liter of working solution was applied synchronously with large and medium elements 21-60 days after transplanting, the dose of 7.5 mL of iron salt stock solution and 15 mL of microelement stock solution were added to each liter of working solution was applied synchronously with large and medium elements. 61-80 days after transplanting, the dose of 5 mL of iron salt stock solution and 10 mL of microelement stock solution were added to each liter of working solution was applied synchronously with large and medium elements.

TABLE 1 formulations of large and medium elements in the nutrient solution of wrapper tobacco growth at different growth periods

| | Nutrient solution concentration (mg/L) | | | |
| --- | --- | --- | --- | --- |
| Salt | 0-20 d after transplanting | 21-60 d after transplanting | 61-80 d after transplanting | 81 d after transplanting |
| Calcium nitrat (Ca(NO$_3$)$_2$·4H$_2$O) | 272 | 816 | 544 | 0 |
| Potassium nitrate (KNO$_3$) | 380 | 1140 | 760 | 0 |
| Potassium phosphate monobasic (KH$_2$PO$_4$) | 108 | 324 | 216 | 0 |
| Triammonium phosphate ((NH$_4$)$_3$PO$_4$) | 54 | 162 | 108 | 0 |
| Magnesium sulfate (MgSO$_4$·7H$_2$O) | 246 | 738 | 492 | 0 |

TABLE 2 formulations of iron salts and trace elements used in nutrient solutions

| Category | Salt | Weighing/Concentration |
|---|---|---|
| Iron salt stock solution, 500 ml, 0.02 mol/L, pH = 5.5 | Ferrous sulfate ($FeSO_4 \cdot 7H_2O$) | 2.78 g |
| | Disodium ethylenediaminetetraacetic acid (EDTA-2Na·2H2O) | 3.73 g |
| Microelement stock solution | Potassium iodide (KI) | 0.83 mg/L |
| | Boric acid ($H_3BO_3$) | 11.0 mg/L |
| | Manganese sulfate ($MnSO_4 \cdot 4H_2O$) | 22.3 mg/L |
| | Zinc sulfate ($ZnSO_4 \cdot 7H_2O$) | 8.6 mg/L |
| | Sodium molybdate ($Na_2MoO_4 \cdot 2H_2O$) | 0.25 mg/L |
| | Copper sulphate ($CuSO_4 \cdot 5H_2O$) | 0.025 mg/L |
| | Cobalt chloride ($CoCl_2 \cdot 6H_2O$) | 0.025 mg/L |

(4) Light Control

Based on the two-layer vertical facilities cultivation mode of the present embodiment, the lamp strips with LED light sources supplemental lighting system is built on the lower floor, and the light intensity and light quality of the light source system before installation need to be debugged to meet the following control requirements and implement the supplemental lighting operation: the light intensity in the clumping periods (initial transplanting-the 30th day after transplanting), the vigorous growth periods (the 31th day after transplanting-the 55th day after transplanting) and the maturity periods (the 55th day after transplanting-the 110th days after transplanting (i.e., harvest completed)) of wrapper tobacco leaves growth were 12 $\mu mol \cdot m^{-2} \cdot s^{-1}$, 20 $\mu mol \cdot m^{-2} \cdot s^{-1}$, 16 $\mu mol \cdot m^{-2} \cdot s^{-1}$ respectively, and the light quality composition of the three periods of clumping periods, the vigorous growth periods and maturity periods were set to B+R (i.e., 50% blue light+50% red light), B+R+G (i.e. 60% blue light+30% red light+10% green light), B+R+G+Y (i.e. 30% blue light+30% red light+30% green light+10% yellow light) respectively, according to such a combination of light intensity and light quality for supplemental lighting. Each light source lamp strips is horizontally installed directly above the tobacco plant, and the lamp strips is parallel to the direction of the tobacco plant, and the illumination distance is 30 cm, that is, the hanging height of the lamp will be dynamically adjusted with the growth of the tobacco plant. Day-night cycle with supplemental lighting is 12 hours during the day and 12 hours during the night. The power control of the light source system adopts ZDE-4000 electrical control box, which contains a control loop of 4000 W power control high-power input, which can meet the total power supply of air opening control and timer control loop.

(5) Control of Cultivation Environmental Factors within the Production Facilities System Temperature and humidity control: maintain the air temperature in the facilities at 25±5° C. and the relative humidity of the air at 75%±10%; when the air temperature in the facilities exceeds 35° C. and the relative humidity of the air exceeds 85%, ventilation and window opening should be used in time to achieve cooling and dehumidification.

Pest and disease control: give priority to the use of insect nets, and in principle, if the root and stem do not diseases, no pesticides will be applied; the process medication is mainly spraying cyhalothrin 1000 times for site sanitization and prevention of underground pests, spraying 500 times of Baolik and methamethanine to prevent and control rhizome diseases, spraying 2000 times of imidacloprid to control aphid.

Tobacco plant stability guarantee: the tobacco plant stalk is fixed in the form of a single plant and a single line or a single row and two lines.

(6) Topping and Leaf Retention and Mature Harvesting

Topping and leaf retention: topping at the early flowering periods, and retain 19 effective leaves, and apply tobacco universal bud inhibitor on the same day after topping.

Mature harvesting: the lower leaves (foot leaves containing economic value) are harvested on the 65th day after transplanting, and the interval between the two adjacent harvests is 12-18 days, that is, the five harvests are separated by 12 days, 14 days, 16 days and 18 days respectively.

Comparative Example 1

The supplemental lighting method for wrapper tobacco cultivation provided in this comparative embodiment is basically consistent with example 1, except that no supplemental lighting is carried out, and other management measures are the same as in example 1.

Comparative Example 2

The supplemental lighting method for wrapper tobacco cultivation provided in this comparative embodiment is basically consistent with example 1, except that the agricultural general sodium lamp is used to supplement the light in the clumping periods, the vigorous growth periods and the maturity periods, and the light intensity is always 20 $\mu mol \cdot m^{-2} \cdot s^{-1}$, other management measures are the same as in example 1.

Comparative Example 3

The supplemental lighting method for wrapper tobacco cultivation provided in this comparative embodiment is basically consistent with example 1, except that the light quality is B+R (i.e., 50% blue light+50% red light) in the clumping periods, the vigorous growth periods and the maturity periods, and the light intensity is always 12 $\mu mol \cdot m^{-2} \cdot s$ 1, other management measures are the same as in example 1.

Comparative Example 4

The supplemental lighting method for wrapper tobacco cultivation provided in this comparative embodiment is basically consistent with example 1, except that the light quality is B+R+G (i.e., 60% blue light+30% red light+10% green light) in the clumping periods, the vigorous growth periods and the maturity periods, and the light intensity is always 20 $\mu mol \cdot m^{-2} \cdot s^{-1}$, other management measures are the same as in example 1.

Comparative Example 5

The supplemental lighting method for wrapper tobacco cultivation provided in this comparative embodiment is basically consistent with example 1, except that the light quality is B+R+G+Y (i.e., 30% blue light+30% red light+30% green light+10% yellow light) in the clumping periods, the vigorous growth periods and the maturity periods, and the light intensity is always 16 $\mu mol \cdot m^{-2} \cdot s^{-1}$, other management measures are the same as in example 1.

Performance Testing of the Wrapper Tobacco

The yield rate of wrapper tobacco and appearance quality were tested in accordance with the methods specified in the Hubei Provincial Local Standard 《Quality Specification for Cigar Tobacco Grades》 DB 42/T 1549-2023; the tensile strength of tobacco leaves was measured by an M250-2.5 CT tensile machine (produced by KARL in Germany), and the test objects were tobacco leaves planted with light in the lower layer. The results are shown in Table 3 below:

TABLE 3 the yield rate of wrapper tobacco and key quality performance results of wrapper tobacco

| Dispose | Clumping periods | Vigorous growth periods | Maturity periods | The yield rate of wrapper tobacco (%) | Wrapper tobacco key quality performance |
|---|---|---|---|---|---|
| Example 1 | LED lamp strips: light quality B + R (i.e. 50% blue light + 50% red light), light intensity 12 $\mu mol \cdot m^{-2} \cdot S^{-1}$ | LED lamp strips: light quality B + R + G (i.e., 60% blue light + 30% red light + 10% green light), light intensity 20 $\mu mol \cdot m^{-2} \cdot S^{-1}$ | LED lamp strips: light quality B + R + G + Y (i.e., 30 % blue light + 30% red light + 30% green light + 10% yellow light), light intensity 16 $\mu mol \cdot m^{-2} \cdot S^{-1}$ | 63.46 | The leaf thickness is 51.5 μm, the branch veins are "fine", the oil content is "more", the leaf surface is "flat", and the color uniformity is "uniform"; the tensile force of tobacco leaves is 1.215N. |
| Comparative Example 1 | Agricultural general sodium lamp: light quality visible light full spectrum, light intensity 20 $\mu mol \cdot m^{-2} \cdot S^{-1}$ | | | 35.81 | The leaf thickness is 60.9 μm, the branch veins are "comparatively thicker", the oil content is "more", the leaf surface is "comparatively flat", and the color uniformity is "comparatively uniform"; the tensile force of tobacco leaves is 1.006 N. |
| Comparative Example 2 | No supplemental lighting | | | 22.70 | The leaf thickness is 41.2 μm, the branch veins are "fine", the oil content is "slightly", the leaf surface is "flat", and the color uniformity is "uniform"; the tensile force of tobacco leaves is 0.925N. |
| Comparative Example 3 | LED lamp strips: light quality B + R (i.e., 50% blue light + 50% red light), light intensity 12 $\mu mol \cdot m^{-2} \cdot S^{-1}$ | | | 41.37 | The leaf thickness is 46.7 μm, the branch veins are "fine", the oil content is "present", the leaf surface is "flat", and the color uniformity is "uniform"; the tensile force of tobacco leaves is 1.104N. |
| Comparative Example 4 | LED lamp strips: light quality B + R + G (i.e., 60% blue light + 30% red light + 10% green light), light intensity 20 $\mu mol \cdot m^{-2} \cdot S^{-1}$ | | | 38.41 | The leaf thickness is 64.8 μm, the branch veins are "comparatively fine - thicker", the oil content is "more", the leaf surface is "flat - comparatively flat", and the color uniformity is "comparatively uniform"; the tensile force of tobacco leaves is 1.097N. |
| Comparative Example 5 | LED lamp strips: light quality B + R + G + Y (i.e., 30% blue light + 30% red light + 30% green light + 10% yellow light), light intensity 16 $\mu mol \cdot m^{-2} \cdot S^{-1}$ | | | 54.22 | The leaf thickness is 48.1 μm, the branch veins are "fine - comparatively", the oil content is "present", the leaf surface is "flat", and the color uniformity is "uniform"; the tensile force of tobacco leaves is 1.110N. |

As can be seen from Table 3, by comparing the investigation index of the embodiment and comparative embodiment, it can be found that the yield rate of wrapper tobacco and key quality index of the precise supplemental lighting method for improving the yield rate of the facilities cultivated wrapper tobacco provided in the embodiment 1 of the present disclosure are significantly better than those of the traditional production method (comparative example 1-2). In example 1, the yield rate of wrapper tobacco reaches 63.46%, the wrapper tobacco leaf branch vein is "fine", the oil content is "more", the leaf surface is "flat", the color uniformity is "uniform", and the tensile force of tobacco leaves reaches 1.215 N; compared with the non-supplemental lighting of comparative example 2, the yield rate of wrapper tobacco was increased by more than 41%, the tensile force of tobacco leaves was increased by 31%, and the comprehensive quality of tobacco leaves was significantly improved; Compared with the agricultural general sodium lamp is used to supplement the light of comparative example 1, the yield rate of wrapper tobacco was increased by more than 28%, the tensile force of tobacco leaves was increased by 21%, and the comprehensive quality of tobacco leaves was also significantly improved. The comparative example of other single light quality or constant light intensity can also improve the yield rate of wrapper to a certain extent, but the comprehensive improvement effect is obviously weaker than that of example 1; in addition, due to the light guarantee of the supplemental lighting measures, the vertical planting of more than two layers can be fully realized, that is, the utilization rate of the facilities space can be increased by more than 100%.

It should be noted that the above embodiments all belong to the same invention concept, and the descriptions of each embodiments have their own emphasis, and where the descriptions are not exhaustive in the individual embodiments, reference can be made to the descriptions in other embodiments.

The above embodiments only express the embodiment of the present disclosure, and its description is more specific and detailed, but it cannot be understood as a restriction on the scope of the disclosure. It should be noted that for a person skilled in the art, a number of deformations and improvements can be made without departing from the conception of the present invention, which are within the scope of protection of the present disclosure. Therefore, the scope of protection of the disclosure shall be subject to the attached claims.

What is claimed is:

1. A supplemental lighting method for vertical multi-layer cultivation of wrapper tobacco leaves comprising:
   providing multi-layer vertical facilities, the multi-layer vertical facilities including at least one cultivation rack having a plurality of vertical layers;
   providing supplemental lighting systems to each rack layer, wherein for each rack layer the light intensity and light quality provided by the corresponding supplemental lighting system are set respectively according to a determined growth phase of the tobacco leaves during the cultivation process, wherein the process includes cultivation of tobacco leaves through growth phases comprising a clumping period, a vigorous growth period, and a maturity period;
   during the clumping period, the light intensity provided comprises a first light intensity setting; during the vigorous growth period, the light intensity provided comprises a third light intensity setting; and during the maturity period, the light intensity provided comprises a second light intensity setting;
   wherein the first light intensity setting is between 10-14 $\mu mol \cdot m^{-2} \cdot s^{-1}$, the second light intensity setting is between 14-18 $\mu mol \cdot m^{-2} \cdot s^{-1}$, and the third light intensity setting is between 18-22 $\mu mol \cdot m^{-2} \cdot s^{-1}$; and
   the light quality of each supplemental lighting system is obtained by providing a combination of at least two of red, blue, green, and yellow light.

2. The supplemental lighting method for vertical multi-layer cultivation of wrapper tobacco leaves according to claim 1, wherein the light quality combinations comprise a first light quality, a second light quality, and a third light quality;
   wherein the first light quality comprises 45%-65% blue light and 35%-55% red light; the second light quality comprises 50%-70% blue light, 20%-40% red light, and 5%-15% green light; and the third light quality comprises 25%-40% blue light, 25%-35% red light, 20%-35% green light, and 5%-15% yellow light.

3. The supplemental lighting method for vertical multi-layer cultivation of wrapper tobacco leaves according to claim 2, wherein during the clumping period the light quality comprises the first light quality; in the vigorous growth period the light quality comprises the second light quality; and in the maturity period the light quality comprises the third light quality.

4. The supplemental lighting method for vertical multi-layer cultivation of wrapper tobacco leaves according to claim 1, wherein the supplemental lighting system comprises a light source selected from at least one of lamp strips with LED light sources, lamp tubes with LED light sources, alloy tungsten lamps, and alloy sodium lamps.

5. The supplemental lighting method for vertical multi-layer cultivation of wrapper tobacco leaves according to claim 4, wherein providing the supplemental lighting system includes providing a lighting schedule in a day-night cycle comprising: 12 hours to 16 hours day cycle and 8 hours to 12 hours night cycle.

6. The supplemental lighting method for vertical multi-layer cultivation of wrapper tobacco leaves according to claim 1, wherein vertical spacing between adjacent rack layers is between 1.6 m-2.4 m.

7. The supplemental lighting method for vertical multi-layer cultivation of wrapper tobacco leaves according to claim 1, wherein the multi-layer vertical facilities include a system for controlling temperature and relative humidity within the facility; said system configured to maintain a control temperature between 20° C. to 30° C. and a relative air humidity between 65% to 85%.

8. The supplemental lighting method for vertical multi-layer cultivation of wrapper tobacco leaves according to claim 1, wherein the wrapper tobacco cultivation system comprises at least one of a hydroponic system, a substrate culture system, a planting bag dropper system, and a pipeline vertical cultivation system.

* * * * *